United States Patent
Fujimoto

(10) Patent No.: US 7,707,892 B2
(45) Date of Patent: May 4, 2010

(54) PRESSURE SENSOR

(75) Inventor: Seizo Fujimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/172,045

(22) Filed: Jul. 11, 2008

(65) Prior Publication Data

US 2008/0302189 A1    Dec. 11, 2008

Related U.S. Application Data

(62) Division of application No. 11/525,974, filed on Sep. 25, 2006, now Pat. No. 7,426,869.

(30) Foreign Application Priority Data

May 23, 2006   (JP)   ............................ 2006-142843

(51) Int. Cl.
*G01L 7/00* (2006.01)
(52) U.S. Cl. .......................................... 73/756; 73/700
(58) Field of Classification Search .................. 73/756, 73/700
See application file for complete search history.

(56) References Cited

U.S. PATENT DOCUMENTS

| | | | |
|---|---|---|---|
| 4,350,298 A | 9/1982 | Tada | |
| 4,772,217 A | 9/1988 | Petersen | |
| 5,219,185 A | 6/1993 | Oddenino | |
| 5,478,119 A | 12/1995 | Dye | |
| 5,535,100 A | 7/1996 | Lubahn et al. | |
| 5,823,813 A | 10/1998 | Dye | |
| 5,945,606 A | 8/1999 | Tokunaga et al. | |
| 6,053,049 A | 4/2000 | Chen et al. | |
| 6,223,769 B1 | 5/2001 | Bragg et al. | |
| 6,393,922 B1 | 5/2002 | Winterer | |
| 6,439,058 B1 | 8/2002 | Aratani et al. | |
| 6,539,786 B1 * | 4/2003 | Daly | ........................ 73/114.32 |
| 6,805,537 B2 | 10/2004 | Wu | |
| 6,948,375 B2 | 9/2005 | Nomura | |
| 7,043,933 B1 | 5/2006 | Hayashi et al. | |
| 7,131,335 B2 | 11/2006 | Textor | |
| 2004/0055388 A1 | 3/2004 | Okazaki et al. | |
| 2004/0083817 A1 | 5/2004 | Nomura | |
| 2006/0010975 A1 | 1/2006 | Pluess | |

(Continued)

FOREIGN PATENT DOCUMENTS

DE    44 26 812 A1    2/1996

(Continued)

*Primary Examiner*—Lisa M Caputo
*Assistant Examiner*—Jonathan Dunlap
(74) *Attorney, Agent, or Firm*—Sughrue Mion, PLLC

(57) ABSTRACT

A mounting structure for a pressure sensor serves to facilitate easy attachment of the pressure sensor as well as easy detachment thereof without requiring any large work space. A pair of elastic snap fit portions (8) are formed on a surge tank (4) so as to protrude from a surface thereof, and have engagement protrusions (8a) formed at their one end, respectively, so as to protrude to a side opposite to a case (2). A pair of engaged portions (2b) are formed on the case (2) so as to be engaged with the engagement protrusions (8a), respectively. The snap fit portions (8) are forced to flexibly deform to the pressure sensor (1) when the pressure sensor (1) is attached to and detached from the surge tank (4).

3 Claims, 5 Drawing Sheets

U.S. PATENT DOCUMENTS

2006/0219023 A1    10/2006    Bordonaro et al.

FOREIGN PATENT DOCUMENTS

| | | |
|---|---|---|
| DE | 100 32 616 A1 | 1/2002 |
| DE | 697 10 683 T2 | 8/2002 |
| DE | 699 15 969 T2 | 8/2004 |
| DE | 103 46 205 A1 | 9/2004 |
| DE | 600 12 814 T2 | 1/2005 |
| JP | 08-277733 A | 10/1996 |
| JP | 08277733 A * | 10/1996 |
| JP | 10-122914 A | 5/1998 |
| JP | 2002-019466 A | 1/2002 |
| JP | 2002-370554 A | 12/2002 |
| JP | 2003-42882 A | 2/2003 |

* cited by examiner

PRESSURE SENSOR

This is a divisional of application Ser. No. 11/525,974 filed on Sep. 25, 2006 now U.S. Pat. No. 7,426,869. The entire disclosure of the prior application, application Ser. No. 11/525,974, is hereby incorporated by reference.

BACKGROUND OF THE INVENTION

1. Field of the Invention

The present invention relates to a mounting structure for a pressure sensor that mounts, on a mounting member, the pressure sensor for detecting the pressure of each pressure source such as, for example, the pressure in an intake manifold of an internal combustion engine, the internal pressure in a fuel tank, etc.

2. Description of the Related Art

In the past, as a mounting structure for a pressure sensor by which the pressure sensor having a case that receives a pressure detection part and a pressure introduction pipe that protrudes from the case to the outside is mounted on a mounting member with the pressure introduction pipe being inserted into a sensor mounting hole, there has been known one in which a pair of snap fit portions are arranged on an outer surface of the mounting member, and the pressure sensor is mounted on the mounting member with the case being restrictively supported by the snap fit portions in a direction in which the pressure introduction pipe is inserted into the sensor mounting hole (see, for example, a first patent document: Japanese patent application laid-open No. 2003-42882).

In this case, protrusions formed at tip ends of the snap fit portions, respectively, protrude in directions to oppose to each other, and when the pressure introduction pipe is inserted into the sensor mounting hole thereby to mount the pressure sensor on the mounting member, the snap fit portions once flexibly deform to the outside and then restore to the pressure sensor side, whereby the protrusions engage the upper edge of the pressure sensor thereby to attach the pressure sensor to the mounting member.

However, when the pressure sensor is dismounted or detached from the mounting member, it is necessary to detach the pressure sensor while at the same time flexing the pair of snap fits to the outside, so it is sometimes difficult to detach the pressure sensor from the mounting member with bare hands alone. Thus, there is a problem that even if the snap fit portions are forced to flex to a side opposite to the pressure sensor with the use of a jig, the snap fit portions, being always urged to the pressure sensor side by resilient forces, still become an obstruction to the work of detaching the pressure sensor from the mounting member.

In addition, the pressure sensor might be maintained in the market, and in case where the pressure sensor is to be mounted on a fuel tank of a vehicle, for example, it is mounted on an upper portion of the fuel tank that is arranged at a lower portion of the vehicle body, so there is no sufficient room for work space. Thus, in the above-mentioned mounting structure for a pressure sensor which requires a large work space, there is a problem that the work to detach the pressure sensor from the mounting member is very difficult.

SUMMARY OF THE INVENTION

Accordingly, the present invention is intended to obviate the problems as referred to above, and has for its object to provide a mounting structure for a pressure sensor which is capable of attaching and detaching the pressure sensor with respect to a mounting member in a simple manner, and which does not need a large work space when the pressure sensor is detached.

According to one aspect of the present invention, there is provided a mounting structure for a pressure sensor in which the pressure sensor having a case that receives a pressure detection part and a pressure introduction pipe that protrudes from the case to the outside is mounted on a mounting member that has a mounting hole, with the pressure introduction pipe being inserted into the mounting hole. The structure includes: an elastic snap fit portion that is formed on the mounting member so as to protrude from a surface thereof, the snap fit portion having an engagement protrusion formed at an end thereof so as to protrude to a side opposite to the case; and an engaged portion that is formed on the case so as to be engaged with the engagement protrusion. The snap fit portion is forced to flexibly deform to the pressure sensor when the pressure sensor is attached to and detached from the mounting member.

According to another aspect of the present invention, there is provided a mounting structure for a pressure sensor in which the pressure sensor having a case that receives a pressure detection part and a pressure introduction pipe that protrudes from the case to the outside is mounted on a mounting member that has a mounting hole, with the pressure introduction pipe being inserted into the mounting hole. The structure includes: an elastic snap fit portion that is formed on the case so as to extend toward the mounting member, the snap fit portion having an engagement protrusion formed at an end thereof so as to protrude to a side opposite to the case; and an engaged portion that is formed on the mounting member so as to be engaged with the engagement protrusion. The snap fit portion is forced to flexibly deform to the pressure sensor in the process of the pressure sensor being attached to and detached from the mounting member.

According to a mounting structure for a pressure sensor of the present invention, it is possible to attach or detach the pressure sensor with respect to a mounting member in a simple manner, and no large work space is required when the pressure sensor is detached.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
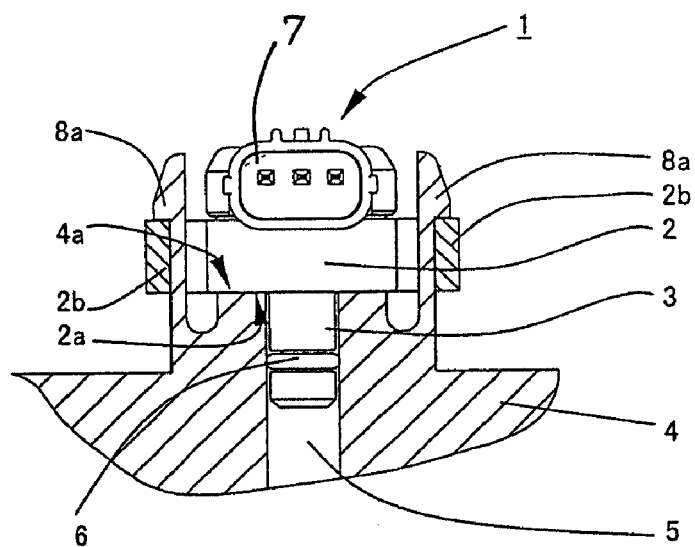
FIG. 1 is a partial cross sectional view showing a mounting structure for a pressure sensor according to a first embodiment of the present invention.

Now, preferred embodiments of the present invention will be described in detail while referring to the accompanying drawings. Throughout respective figures, the same or corresponding members or parts are identified by the same reference numerals and characters.

Embodiment 1

Figure 2:
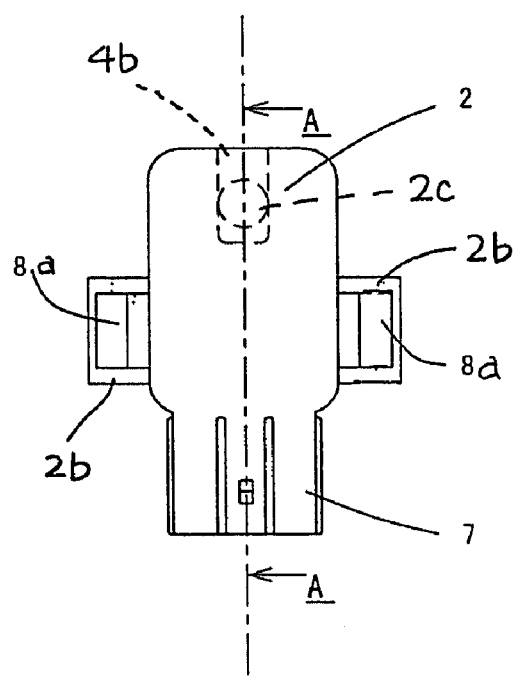
FIG. 2 is a plan view of the mounting structure for a pressure sensor of FIG. 1.
Figure 3:
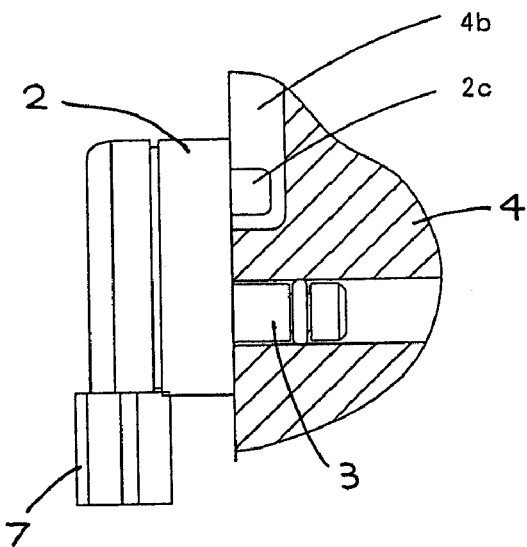
FIG. 3 is a partial cross sectional arrow view along line A-A in FIG. 2.

Referring to the drawings and first to FIG. 1, there is shown, in a partial cross section, a mounting structure for a pressure sensor according to a first embodiment of the present invention. FIG. 2 is a plan view of FIG. 1, and FIG. 3 is a partial cross sectional arrow view along line A-A in FIG. 2.

The pressure sensor, generally designated at reference numeral 1, is provided with a case 2 made of resin that receives component parts including a pressure detection part (not shown), a pressure introduction pipe 3 that protrudes from the case 2 to the outside, a connector 7 that transmits, to an electronic control unit (not shown), a detection signal detected by the pressure detection part that is arranged so as to protrude from the case 2, and an O ring 6 that is mounted on an end of the pressure introduction pipe 3.

The pressure sensor 1 has a pair of engaged portions 2b each of a channel shape in cross section arranged at opposite sides of the case 2, respectively. Also, a convex portion 2c is formed on a bottom surface 2a of the case 2 at a side opposite to the connector 7.

A surge tank 4 in the form of a mounting member, in which the air pressure is detected, is made of a resin material such as a nylon type resin, etc. A sensor mounting hole 5, being in communication with the interior of the surge tank 4, is formed in a seat portion 4a that is formed by a raised part of the surge tank 4.

On the opposite sides of the seat portion 4a, there are formed a pair of snap fit portions 8, respectively, that are made of an elastic or resilient material and extend from the surface of the seat portion 4a in a vertical direction. The flexibly deformable snap fit portions 8 are formed at their tip ends with engagement protrusions 8a protruding to the outer side, respectively. In addition, the seat portion 4a is formed on its surface with a concave portion 4b into which the convex portion 2c of the case 2 is fitted.

When the pressure sensor 1 as constructed above is positioned by inserting the pressure introduction pipe 3 into the sensor mounting hole 5 with the bottom surface 2a of the case 2 being placed in abutment with the surface of the seat portion 4a, the engagement protrusions 8a of the snap fit portions 8 are engaged with the engaged portions 2b, respectively. At this time, the snap fit portions 8 serve to restrictively support or hold the case 2 in an insertion direction in which the pressure introduction pipe 3 is inserted into the sensor mounting hole 5 as well as in a direction perpendicular to the insertion direction (i.e., in a direction parallel to the surface of the seat portion 4a).

In this manner, with the insertion of the pressure introduction pipe 3 into the sensor mounting hole 5, air in the surge tank 4 is introduced into the pressure detection part in the case 2 through the sensor mounting hole 5 and the pressure introduction pipe 3. The pressure detection part detects the pressure of the air thus introduced, and generates a detection signal to the electronic control unit (not shown). Here, note that the O ring 6 serves to prevent fluid communication between the inner side and the outer side of the surge tank 4 through a gap defined between the outer peripheral surface of the pressure introduction pipe 3 and the inner peripheral surface of the sensor mounting hole 5.

Figure 4:
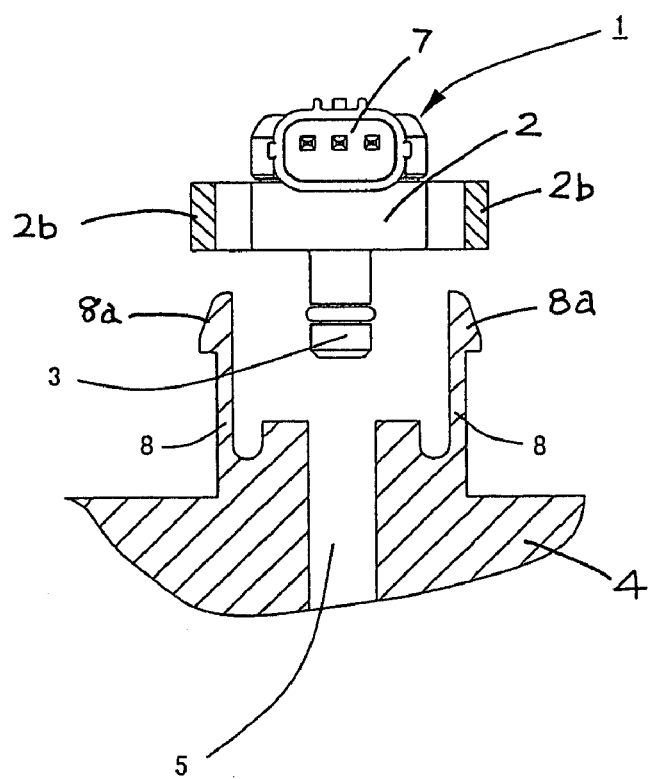
FIG. 4 is a view showing a state before the pressure sensor is mounted.
Figure 5:
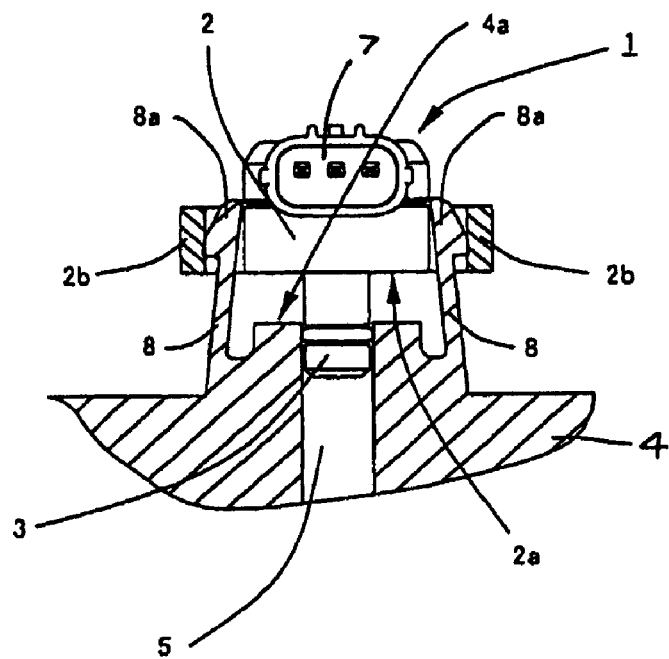
FIG. 5 is a view showing the pressure sensor in the process of being mounted.
Figure 6:
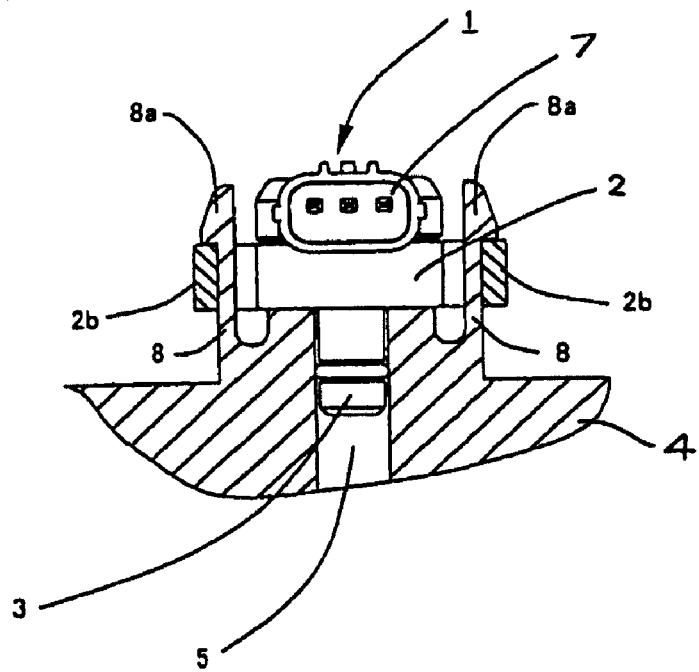
FIG. 6 is a view showing the pressure sensor that has been mounted.

Next, reference will be made to the procedure for mounting (attaching) and dismounting (detaching) the pressure sensor 1 on and from the surge tank 4 while using FIG. 4 through FIG. 7. FIG. 4 shows a state before the pressure sensor 1 is mounted on or attached to the surge tank 4; FIG. 5 shows a state in which the pressure sensor 1 is in a process of being mounted on the surge tank 4; and FIG. 6 shows a state in which the pressure sensor 1 has been mounted on the surge tank 4. Also, FIG. 7 shows a state in which the pressure sensor 1 is in the process of being dismounted.

The pressure sensor 1 is mounted onto the surge tank 4 with the pressure introduction pipe 3 being inserted into the sensor mounting hole 5. In the process of the pressure introduction pipe 3 being inserted into the sensor mounting hole 5, the pair of snap fit portions 8 are flexibly deformed in a direction to decrease the distance between the engagement protrusions 8a (see FIG. 4 and FIG. 5), whereby the bottom surface 2a of the case 2 is placed into abutment with the surface of the seat portion 4a. Thus, the pressure sensor 1 is positioned on the seat portion 4a, and substantially at the same time, the narrowed snap fit portions 8 restore to their original state, as shown in FIG. 4, so the engagement protrusions 8a are engaged with the engaged portions 2b, respectively (see FIG. 6).

Figure 7:
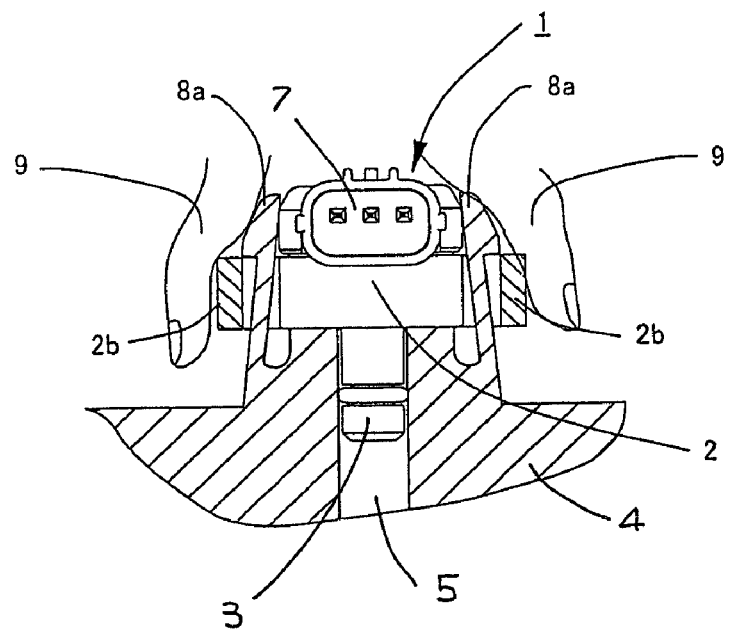
FIG. 7 is a view showing the pressure sensor that is in the process of being detached.

When the pressure sensor 1 is dismounted or detached from the surge tank 4, the engagement protrusions 8a are pressed to narrow to each other by using fingers 9 of a hand, as shown in FIG. 7, and at the same time the pressure sensor 1 is lifted or pushed up while holding the engaged portions 2b, whereby the pressure sensor 1 can be detached from the surge tank 4. After the detachment of the pressure sensor 1, the narrowed snap fit portions 8 restore to the original state, as shown in FIG. 4.

As described in the foregoing, according to the mounting structure for a pressure sensor of this first embodiment, attachment and detachment of the pressure sensor 1 with respect to the surge tank 4 can be carried out with only a small work space and by an easy, one-touch operation, as compared with the aforementioned known pressure sensor mounting structure that needs a jig and a large work space upon detachment of the pressure sensor 1.

Also, when the pressure sensor 1 is mounted or attached to the surge tank 4, the pressure sensor 1 is restrictively supported or held by the snap fit portions 8 in a direction in which the pressure introduction pipe 3 is inserted into the sensor mounting hole 5, and the movement of the pressure sensor 1 in a direction along the surface of the surge tank 4 is restricted by the insertion of the pressure introduction pipe 3 into the sensor mounting hole 5.

In addition to this, when the pressure sensor 1 is mounted on the surge tank 4, the convex portion 2c of the case 2 is placed in fitting engagement with the concave portion 4b of the surge tank 4, whereby the rotation of the pressure sensor 1 is also restricted in cooperation with the insertion of the pressure introduction pipe 3 into the sensor mounting hole 5.

Further, the amount of flexible displacement or deformation of the snap fit portions 8 when the pressure sensor 1 is detached from the surge tank 4 is limited by the abutment of the engagement protrusions 8a against the upper portion of the case 2, so it is possible to avoid a situation in which a force greater than required might be applied to the snap fit portions 8 by the fingers 9 to push the snap fit portions 8 to narrow more than required, thus resulting in damage or breakage thereof.

Embodiment 2

Figure 8:
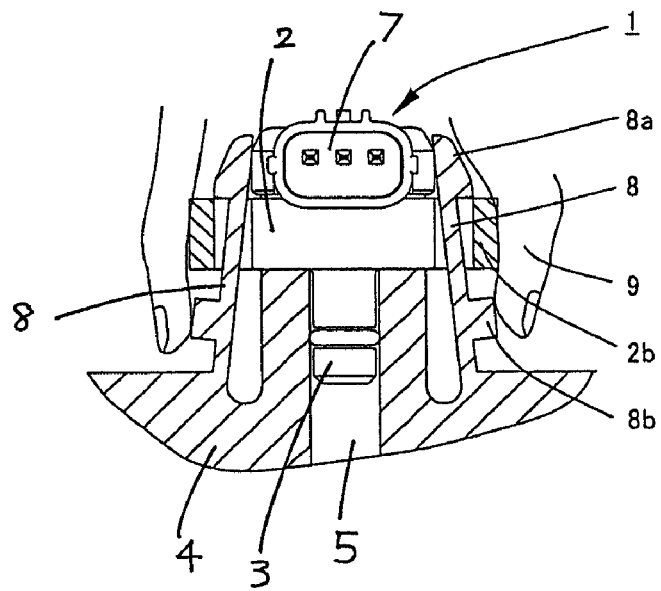
FIG. 8 is a partial cross sectional view showing a mounting structure for a pressure sensor according to a second embodiment of the present invention.

FIG. 8 is a partial cross sectional view that shows a mounting structure for a pressure sensor according to a second embodiment of the present invention. In this embodiment, a detaching protrusion 8b is formed at a basal side of each snap fit portion 8. The construction of this second embodiment other than the above is similar to that of the first embodiment.

In this embodiment, the pair of snap fit portions 8 are flexibly deformed in a direction to decrease the distance between the engagement protrusions 8a by pressing the detaching protrusions 8b by the fingers 9 of the hand, and at the same time, the detaching protrusions 8b are held and lifted, whereby the pressure sensor 1 can be easily detached from the surge tank 4.

Embodiment 3

Figure 9:
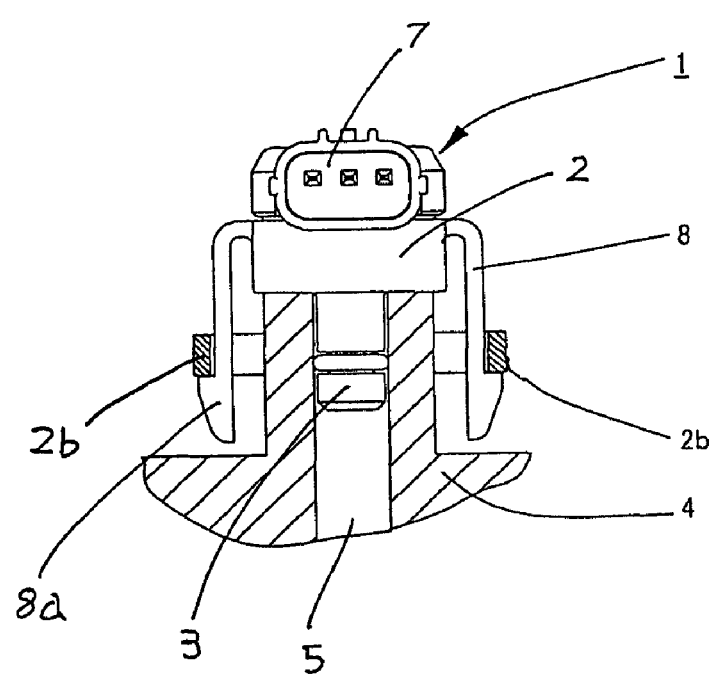
FIG. 9 is a partial cross sectional view showing a mounting structure for a pressure sensor according to a third embodiment of the present invention.

FIG. 9 is a partial cross sectional view that shows a mounting structure for a pressure sensor according to a third embodiment of the present invention. In this embodiment, the case 2 of the pressure sensor 1 is provided with a pair of L-shaped snap fit portions 8 extending to a surge tank 4 side. The snap fit portions 8 having elasticity or resiliency are formed at their tip ends with engagement protrusions 8a, respectively, protruding to a side opposite to the case 2. The seat portion 4a of the surge tank 4 is formed on a vertical surface thereof with engaged portions 2b each of a channel shape in cross section with which the engagement protrusions 8a are engaged. The construction of this third embodiment other than the above is similar to that of the first embodiment.

In this embodiment, similar to the first and second embodiments, the pressure sensor 1 is restrictively supported or held on the surge tank 4 by means of the snap fit portions 8 and the engaged portions 2b, so attachment and detachment of the pressure sensor 1 is achieved by flexibly deforming the snap fit portions 8 to the pressure sensor 1 side.

Although in the above-mentioned first through third embodiments, an explanation has been made by taking the surge tank 4 as an example of the mounting member, the present invention is not of course limited to this, but any mounting member may be used which has a surface on which the pressure sensor can be mounted.

Also, a rubber hose or the like may be attached to the pressure introduction pipe 3 of the pressure sensor 1, so that the pressure at a location other than the surge tank 4 can be measured. In this case, the O ring 6 becomes unnecessary.

Further, in the above-mentioned first through third embodiments, the one pair of snap fit portions 8 arranged in opposition to each other are used in any case, but the same advantageous effects as in the first through third embodiments can be achieved, for example, even with only a single snap fit portion formed on the back surface of the case 2 at a side opposite to the connector 7.

In addition, a concave portion may be formed on the bottom surface 2a of the case 2, and a convex portion, being fitted into the concave portion, may be formed on the surface of the seat portion 4a of the surge tank 4.

While the invention has been described in terms of preferred embodiments, those skilled in the art will recognize that the invention can be practiced with modifications within the spirit and scope of the appended claims.

What is claimed is:

1. A mounting structure for a pressure sensor in which said pressure sensor having a case that receives a pressure detection part and a pressure introduction pipe that protrudes from said case to the outside is mounted on a mounting member that has a mounting hole, with said pressure introduction pipe being inserted into said mounting hole, said structure comprising:

an elastic snap fit portion that is formed on said case so as to extend toward said mounting member, said snap fit portion having an engagement protrusion formed at an end thereof so as to protrude to a side opposite to said case; and an engaged portion that is formed on said mounting member so as to be engaged with said engagement protrusion;

wherein:

said engaged portion comprises a channel shape extending substantially parallel to said pressure introduction pipe;

said channel shape comprises an outer member and an inner member;

said engagement protrusion engages with said outer member;

said inner member extends coaxially with said outer member; and said snap fit portion is forced to flexibly deform to said pressure sensor in the process of said pressure sensor being attached to and detached from said mounting member.

2. The mounting structure for a pressure sensor as set forth in claim 1, wherein said snap fit is operative to prevent movement of the pipe along an insertion direction within the hole.

3. The mounting structure for a pressure sensor as set forth in claim 1, wherein the flexible deformation of said snap fit portion is limited by abutment of said engagement protrusion against inner surfaces of said channel shape.

* * * * *